CABINET HAVING MOVABLE STORAGE CONTAINER
Filed June 7, 1950 6 Sheets-Sheet 1
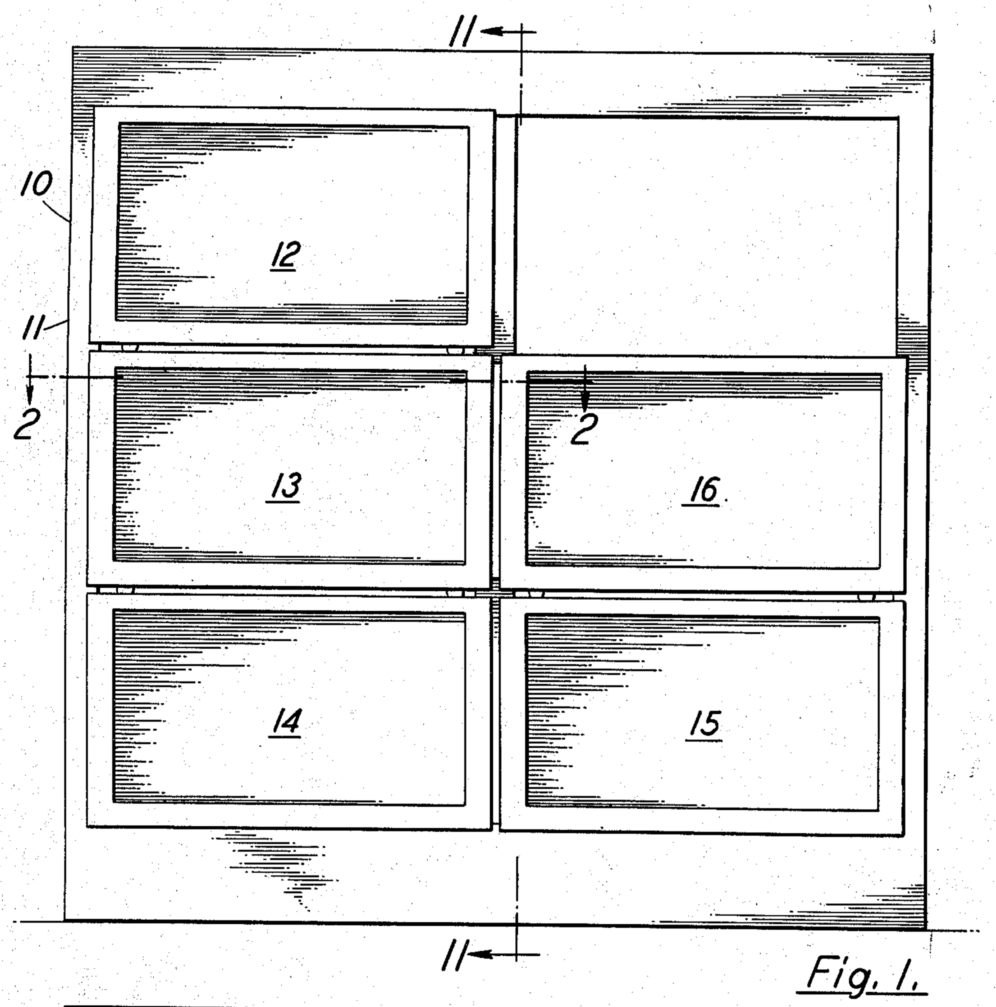
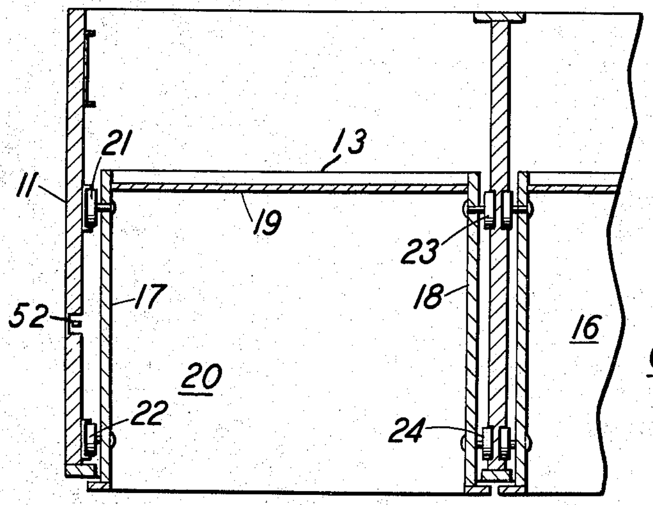
Fig. 2.
Inventors
Eli Epstein
Cornelius W. Christie
By
Glenn B. Morse
Attorney

CABINET HAVING MOVABLE STORAGE CONTAINER

Filed June 7, 1950 6 Sheets-Sheet 2

Inventors
Eli Epstein
Cornelius W. Christie
By
Glenn B. Morse
Attorney

Inventors
Eli Epstein
Cornelius W. Christie
By
Glenn B. Morse
Attorney

CABINET HAVING MOVABLE STORAGE CONTAINER

Filed June 7, 1950 6 Sheets-Sheet 4

Inventors
Eli Epstein
Cornelius W. Christie
By
Glenn B. Morse
Attorney

Nov. 11, 1952 C. W. CHRISTIE ET AL 2,617,700

CABINET HAVING MOVABLE STORAGE CONTAINER

Filed June 7, 1950 6 Sheets-Sheet 5

Inventors

Eli Epstein

Cornelius W. Christie

By

Glenn B. Morse

Attorney

Inventors
Eli Epstein
Cornelius W. Christie
By
Glenn B. Morse
Attorney

Patented Nov. 11, 1952 2,617,700

UNITED STATES PATENT OFFICE 2,617,700

CABINET HAVING MOVABLE STORAGE CONTAINER

Cornelius W. Christie and Eli Epstein, Grand Rapids, Mich.

Application June 7, 1950, Serial No. 166,602

11 Claims. (Cl. 312—223)

The present invention provides a storage and display cabinet. The particular characteristics of this cabinet include two columns of storage containers, and mechanism adapted to place containers from one column over to the next column and vice versa to generate a progressive movement of each element of the columns in a desired direction. Preferably, the storage containers are generally rectangular shape and open upon one of the longer vertical sides. The columns of containers are arranged with the open sides in substantially the same plane. With this arrangement, the contents of the containers are made open to view and are readily accessible. The space occupied by the entire operating structure is not greatly in excess of that occupied by the columns of containers themselves.

During the moving operation, the top container of one column is transferred to the other, and the bottom container of the opposite column is moved over to the column first mentioned. As this movement continues, it will be seen that each of the individual containers moves gradually around a circuit in a step-by-step fashion. When the device is used for display purposes, the entire height from floor to ceiling of a warehouse or store may be utilized while permitting personnel to obtain access to any given container by operating the control a sufficient length of time to permit the desired container to pass from its original position in the two stacks around to the point where it may be examined from the floor level. With merchandise stored in this fashion, it becomes unnecessary to restrict the storage height to that to which a man can reach; or, alternatively, to provide a series of ladders or other similar equipment requiring considerable space and being generally cumbersome to manage. The pleasing appearance of a structure built according to the present invention, combined with the novelty value of a customer's watching the operations causing the movement of the various storage containers, is such as to render the device particularly well adapted to self-serve installations in which the customer may be permitted to operate the controls until the desired merchandise arrives at a position within his reach. A device on this order placed in a show window will not only attract passers-by due to the movement of the components, but will bring into close view a considerable variety of merchandise otherwise requiring a much greater frontal area for adequate display. The adaptability of this device to libraries has obvious advantages over the usual arrangement in which the upper shelves are useable only for the works only occasionally referred to due to the difficulty of keeping them clean and taking them to and from their positions. Other fields of utility of this type of mechanism are provided by deep-freeze units in which a vertically-moving storage rack would make accessible (at the upper portion) the contents of the unit without necessitating an opening from the side that would result in spilling a large part of the cold air. Kitchen cupboards, filing cabinets, clothes closets, lockers, and particularly storage installations in moving vehicles such as trains and trailers where space is at a premium all will find the features of the present invention readily adaptable to their particular needs. The use of such a device in modified form as an amusement ride has also been suggested.

The prior art teaches a great variety of systems providing for the movement of containers within the confines of a surrounding structure. The art relating to storage and display cases provides a number of devices in which two adjacent columns of containers are disposed one behind the other with the upward movement of one column and the downward movement of the adjacent one being obtained by associating the various containers with chains or cables passing over suitable wheels or sprockets. The difficulty with this arrangement for display purposes is that one column of containers hides the other from view and thereby destroys a large amount of the value of the unit. The type of movement from one column to another characteristic of the cable or chain type mechanism is such that a considerable amount of clearance is required for the containers. Additionally, the sprockets and cables operate under considerable load and the bearings necessary to support these loads must be mounted upon sufficient structure to adequately carry the stresses to the floor. It is the usual case that the supporting cables or chains are either so positioned that the containers could not practicably be opened at the ends that have movement in a common plane, or would otherwise require a considerable lateral spacing in order to provide for the mechanism located between the columns of containers. It is also noted that the cable and chain type systems either involve a disagreeable pendulum-type suspension of the containers upon the flexible tension members, or else require an elaborate shifting sequence to take place as the tension members pass over the pulleys in order to avoid inverting of the containers during this process.

In addition to the art related to display cabinets, it is noted that a group of patents has been issued relating to automatic automobile parking racks in which a car can be driven onto a platform moveably mounted within the confines of a framework. While this general principle of moving containers around a circuit is utilized in the present invention, the mechanism used to accomplish this type of operation in the case of the automobile parking racks is not applicable for installation on display and storage racks, even on a reduced scale. The cyclical operation establishing the movement of the containers around the circuit involves a series of sequential operations that may be summarized as follows:

*Position 1.*—Two columns of containers are placed side-by-side with one column preferably having one less container than the other, and the odd container appearing at the top.

*Position 2.*—The top container is transferred in a generally horizontal plane over to the adjacent column.

*Position 3.*—Both columns are elevated—the higher column just sufficiently to remove the weight of the column from the lowermost container, and the shorter column so that the uppermost container in that column is level with the uppermost container of the opposite column.

*Position 4.*—The lowermost container of the column having the larger number of containers is transferred in a generally horizontal plane across to the opposite column.

*Position 5.*—The columns are lowered so that the weight of the same is supported upon the lowermost containers in each column.

Rails are provided in the tops of the containers cooperating with rollers on the bottoms of adacent containers so that each container operates as a guide for the containers immediately above it during the horizontal transfer movement. The elevating mechanism of the preferred form of the invention involves a screw-jack acting in a horizontal plane and causing the lower end of a slanted member to likewise move in a horizontal plane. The upper end of this slanted member is provided with a roller that bears against the vertical side of the framework of the structure. It will be seen that the horizontal movement of the lower end of the slanted member will cause the roller end of the same member to move in a vertical direction. This vertical movement is transferred to the containers through the action of an engaging flap controlled by the action of a sequence-determining system that will be discussed hereinafter. The cross movement of the containers in the generally horizontal planes is preferably provided by forces applied by an endless belt that moves around the outside of both stacks of containers just inside the framework. Means are provided for engaging this belt with individual containers at the proper moment. The frictional forces generated in this manner are sufficient to move the containers across from one column to another.

The lifting mechanism described above preferably engages the containers at the back, resulting in a tendency for the combined action of the lifting and the weight of the container to generate a rolling moment. This moment is opposed by the engagement of suitable rollers at the sides of the containers with grooves or tracks in the framework. As the containers are transferred from one column to another, these stabilizing rollers engage and disengage due to the natural alignment established by the tracks and rollers on the containers themselves. As the containers move from the positions in which transfer from one column to another takes place, the side rollers firmly engage with the guide channels associated with the framework and establish the alignment of the stack of containers much more positively than would be the case if the positioning of the uppermost container were left to the accumulated positioning tolerances of the entire stack.

Preferably, the sequence of the shifting operations is controlled by a series of switches. The position of the various switches about the framework establishes the circuits causing the operation of the cycle of movements. The switches are actuated by the containers themselves; and as the containers move from one position to another, the circuits are altered accordingly causing the next shifting operation to take place. An alternative arrangement for establishing the sequence of operations would be a conventional cam-operated circuit controller in which the continuing movement of a cam established a particular sequence of operations. The natural sequence system established by the containers themselves is preferred, however, since any misbehavior of the device will result in the complete halt of operations rather than the continuing action of the mechanism to possibly further increase the damage that may have already occurred.

The several features of the present invention will be discussed in detail by an analysis of the particular embodiments illustrated in the accompanying drawings. In these drawings:

Figure 1 is an outside elevation of a device embodying the present invention as viewed from the front.

Figure 2 is a section taken on the plane 2—2 of Figure 1.

Figures 13 through 22, inclusive, illustrate schematically the various positions of the containers as viewed from the rear of the device.

Figure 23:
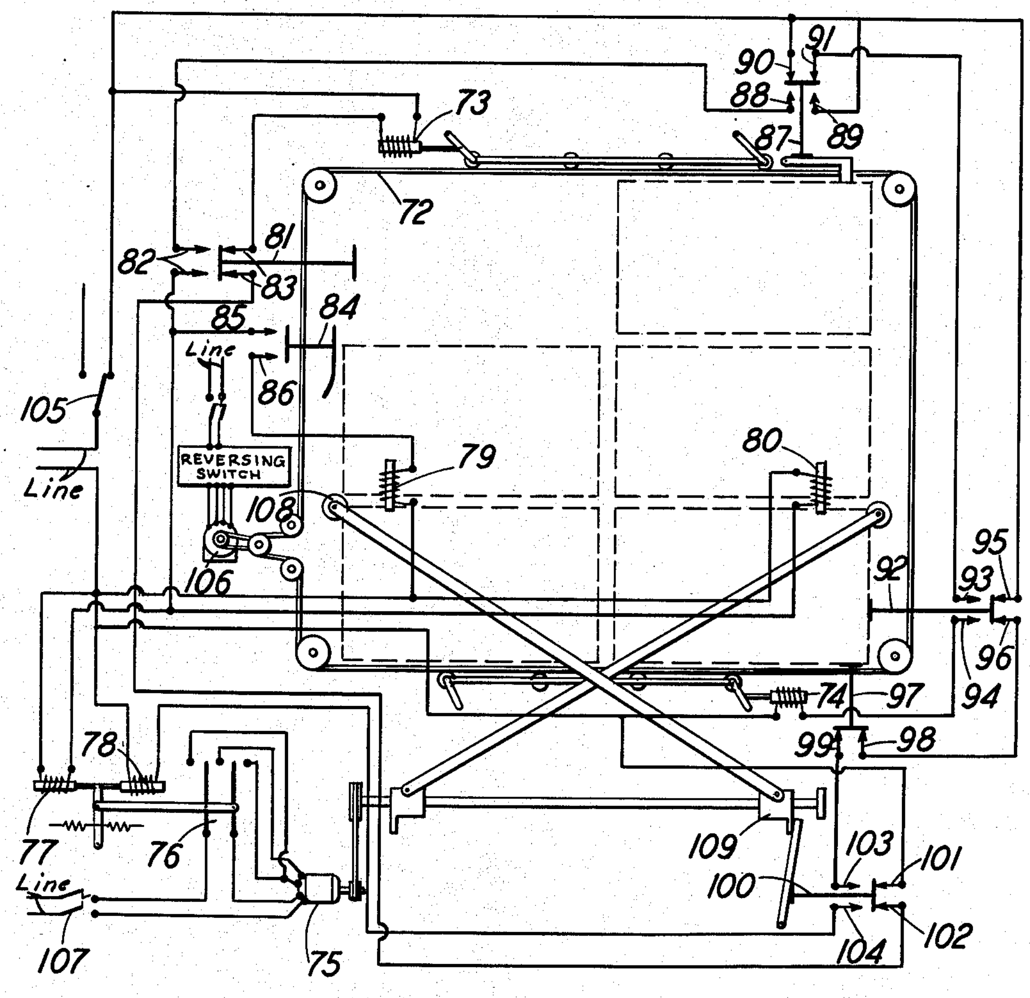

Figure 23 is a schematic diagram showing the sequence-determining circuits, and indicating the manner in which the switches and other components of this system are operated by the moving containers and mechanism.

Figure 24:
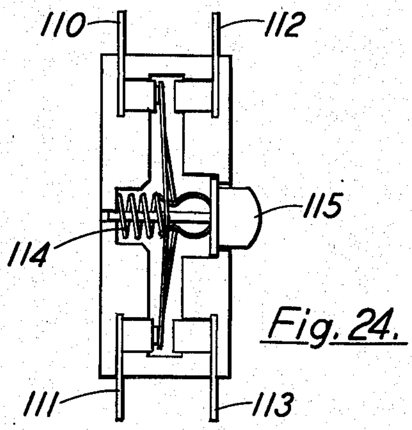

Figure 24 is an enlarged view of a conventional switch of a type such as is used in the mechanism described in connection with Figure 23.

*Structure*

Referring to Figure 1, the cabinet unit designated as 10 includes the frame 11 and the shiftable containers 12, 13, 14, 15, and 16. The section shown in Figure 2 is taken through the containers 13 and 16, and shows the relative position of the containers and the frame. The structure of the containers themselves includes the sides 17 and 18, the back 19, the top (not shown on the view in Figure 2), and the bottom 20. Merchandise or other material can be placed in position on the bottom 20 through the open side of the container 13 facing the front.

Figures 3, 4:
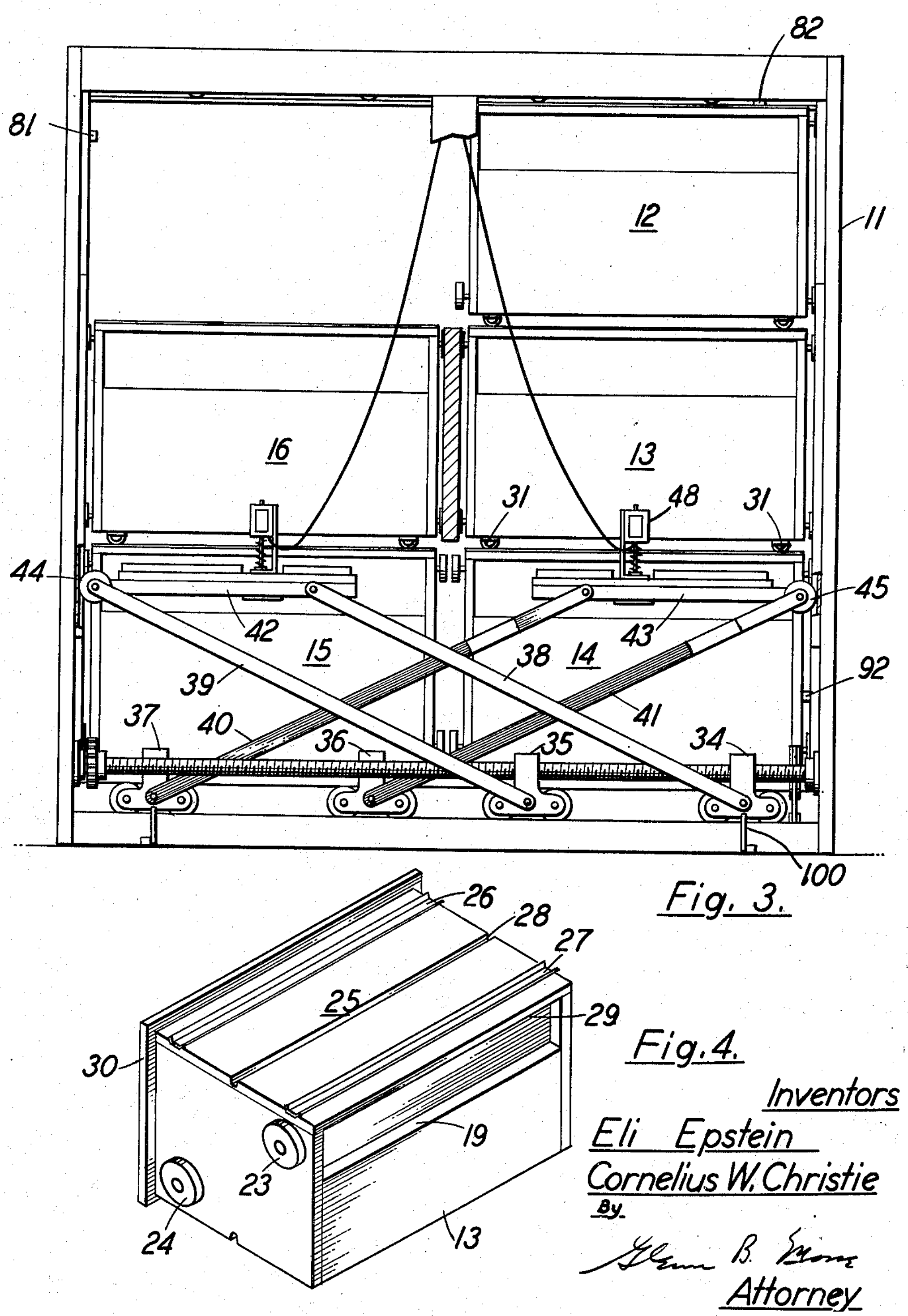
Figure 3 is an elevation taken from the rear of the device shown in Figure 1 and illustrates the exterior appearance of the lifting mechanism, containers, and framework.
Figure 4 is a perspective view taken from the rear showing one of the containers used in conjunction with the device illustrated in Figures 1 to 3.

The structure of the containers is illustrated best in Figures 2 and 4. The stabilizing rollers 21, 22, 23, and 24 engage suitable guiding channels in the sides and central structure of the frame and prevent rotation of the containers on a horizontal axis through the moment generated by the combined action of gravity and the engagement of the lifting mechanism with the back 19. The top 25 of the container is provided with the tracks 26 and 27 for receiving rollers on the bottom of the container immediately above. The container 13 is likewise provided with such rollers at the bottom, but these rollers do not appear in either Figures 2 or 4. The V-shaped groove 28 is in position as shown, and is adapted to receive a belt when pressed into engagement by a mechanism which will be discussed hereinafter. The movement of this belt induces the transfer of the container from one column to another. At the rear of the top 25, a ledge 29 is formed providing a point for engagement with the lifting mechanism. The flange 30 surrounding the open front of the container is adapted to conceal the mechanism within the framework and between the various containers.

Referring to Figure 3, the position of the lower rollers carrying the weight of the container 13 (and any containers positioned above it) is more clearly shown. The rollers 31 cooperate with the similarly-placed tracks at the top of the containers underneath, and a similar pair of rollers is positioned directly behind the rollers 31 as shown in Figure 3 so as to establish a 4-point support. Figure 3 also illustrates a general view of the lifting mechanism whereby the vertical movement of the containers is provided.

Referring to Figures 3, 7, 8, and 9, the screw members 32 and 33 are located with their axes in a horizontal plane at the lower portion of the frame 11. The trucks 34 and 35 are engaged by the threaded member 32, and the trucks 36 and 37 are engaged by the other threaded member 33. These trucks are provided with rollers bearing on a lower surface associated with the frame 11 so as to carry the vertical loads imposed by the arms 38, 39, 40, and 41. These arms are pivotally connected to the trucks, and are connected at the opposite ends with the beams 42 and 43 to give a pantograph movement. At the outer ends of the beams, the rollers 44 and 45 are mounted for engagement with vertical surfaces associated with the frame 11 so as to confine the movements of the beams 42 and 43 to an exclusively vertical direction.

Figure 7:
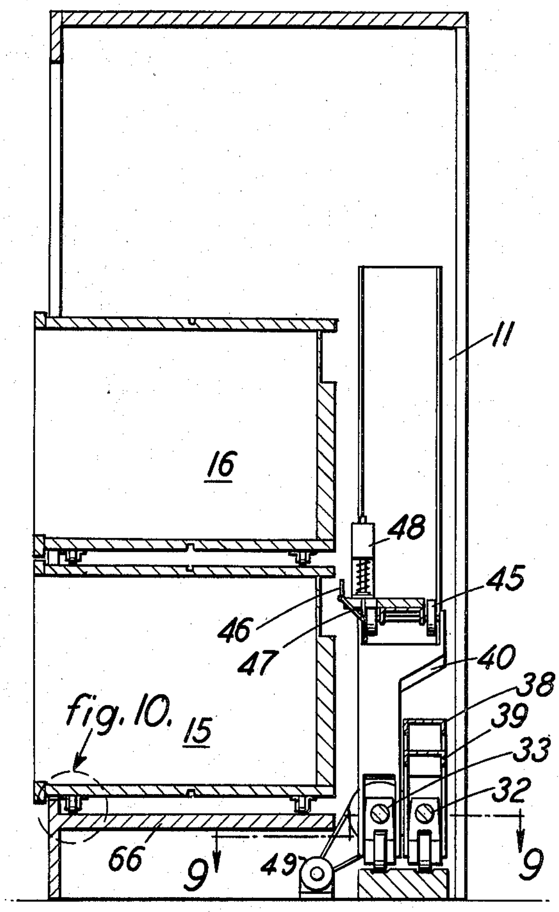
Figure 7 is a sectional view in elevation showing the relative position of the lifting mechanism and the containers with the lifting mechanism in the "down" or inactive position.
Figure 8:
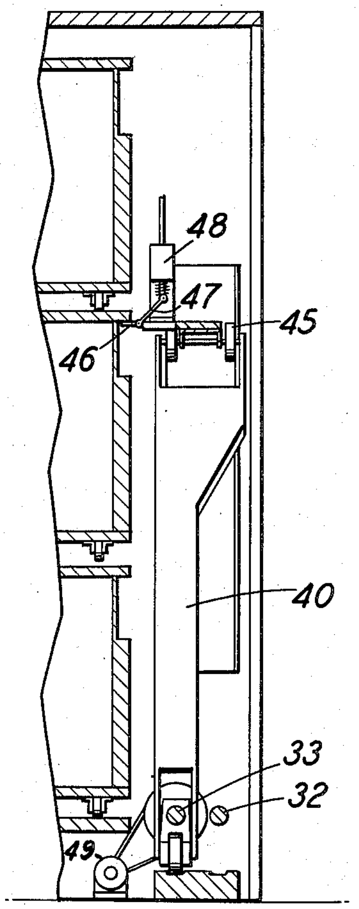
Figure 8 shows the lifting mechanism of Figure 7 in "up" position with the lifting flaps engaged. The containers have been elevated a sufficient amount to provide clearance for the transfer movement of the lowermost container.
Figure 9:
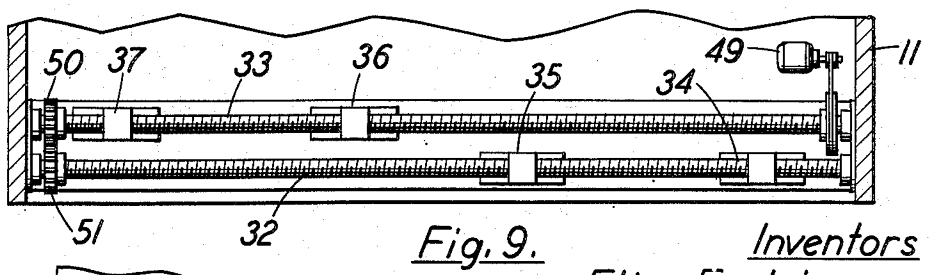
Figure 9 is a section taken on a generally horizontal plane 9—9 of Figure 7.

An engaging mechanism is mounted on the beam 42 and also on the beam 43 for controllable engagement with the containers. The hinged flap 46 is adapted to pivot from the position shown in Figure 7 to that shown in Figure 8 to engage the ledge at the upper rear of the containers as is indicated at 29 in Figure 4. A lever 47 associates the flap 46 with the plunger of a solenoid 48, and the action of the solenoid serves to rotate the flap 46 to and from engaging position. The energizing of the solenoid 48 will elevate the plunger and rotate the flap 46 as shown in Figure 7 in a counter-clockwise direction so as to engage the ledge of the container as shown in Figure 8.

The power required to rotate the threaded members 32 and 33 is derived from the motor 49. A suitable belt transfers torque to the threaded member 33, and the gears 50 and 51 operate to rotate the threaded members 32 and 33 in opposite directions. With the the same "hand" of thread on the threaded members 32 and 33, rotation of the motor in any given direction will cause the trucks 34 and 35 to move in the same direction, and the trucks 36 and 37 to move together in the opposite direction.

Figure 5:
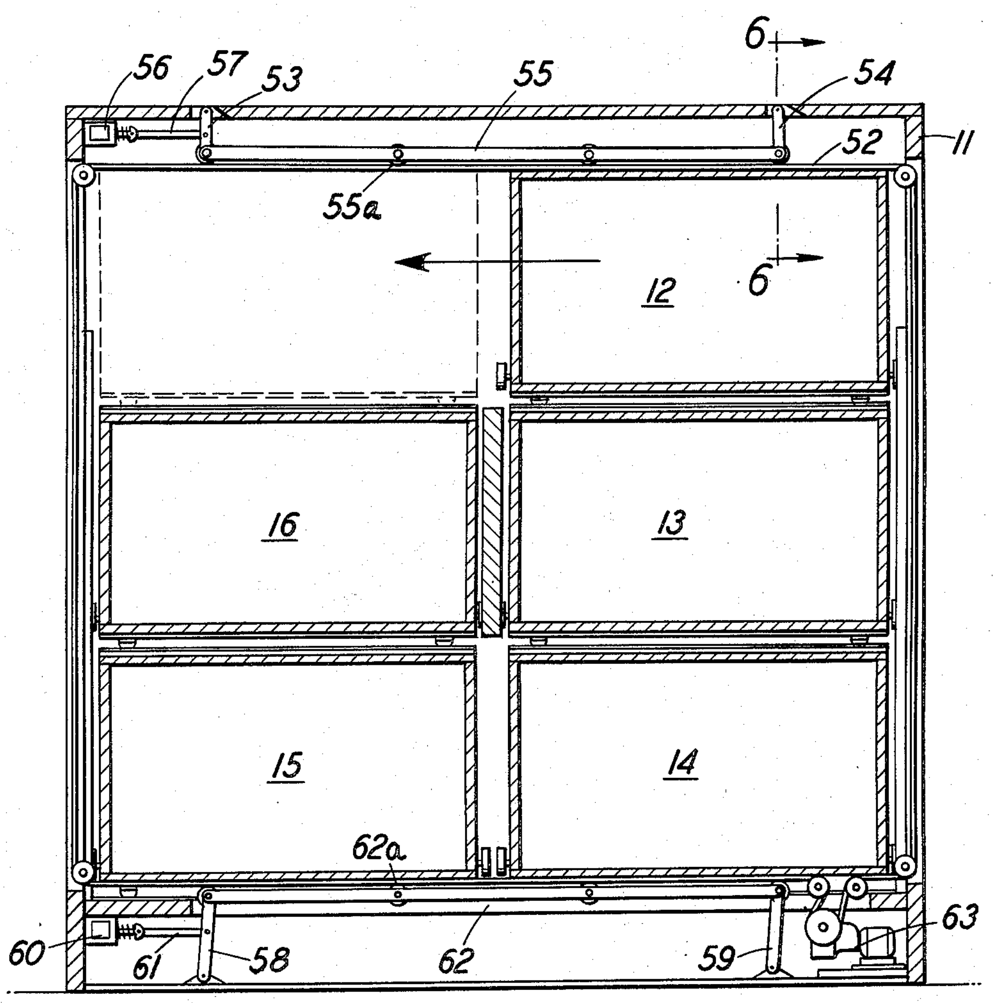
Figure 5 is a section taken in elevation on a vertical plane at approximately the plane of the transferring belt, and indicates the mechanism associated with the transfer movements of the container. The plane of this view is on approximately the middle of the device and parallel to the front.
Figure 6:
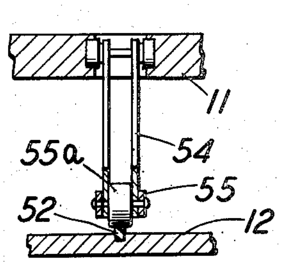
Figure 6 is a section taken on the plane 6—6 of Figure 5 and illustrates the linkage used to urge the moving belt into engagement with the containers to induce the transfer movement.
Figure 10:
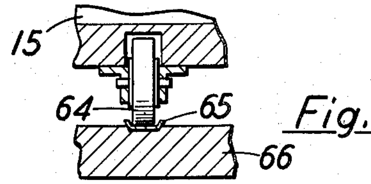
Figure 10 is an enlarged view of the area indicated at 10 in Figure 7 and illustrates the rollers used to permit the transfer movement of a container from one column to another.

Referring to Figures 5, 6, and 10, the mechanism for inducing the transfer movement of a container from one stack to another is illustrated. To move the container 12 from the position shown at the top of the right-hand stack as viewed from the rear over to the top of the left-hand stack (on top of the container 16), forces are transferred from the moving belt 52 to the container through frictional engagement at the grooves as indicated at 28 in Figure 4. Normally, the belt 52 rides clear of the containers. At the portions of the cycle at which it is appropriate for the transfer movement to begin, the belt is deflected from its normal path and pressed into engagement with the groove 28 inducing the necessary frictional forces required to cause the transfer movement. The mechanism for pressing the moving belt into engagement with the containers includes the arms 53 and 54 pivotally mounted at their upper ends to the frame 11. The lower ends of each of the arms is pivotally connected to the roller beam 55 carrying the rollers 55*a* as shown. The solenoid 56 operates to rotate the arms 53 and 54 about their upper pivotal connections to the frame 11 by forces transferred through the link 57. Energizing the solenoid 56 will cause the arms to be moved so as to bring the roller beam in a downward direction and press the moving belt 52 into engagement with the uppermost container. A similarly arranged mechanism is located at the bottom of the frame 11 and establishes the transfer movement of the lowermost containers. The arms 58 and 59 are pivoted to the frame 11 and are positioned by the solenoid 60 and the link 61. Energizing this solenoid operates to move the roller beam 62 and the rollers 62a in an upward direction and urge the belt into engagement with the containers at a groove in the bottom thereof similar to the groove 28 shown in Figure 4 on the top. The position of the grooves is best shown in Figure 7. The movement of the belt 52 is established by the gear motor 63, and suitable pulleys are positioned to establish the movement of the belt around the desired path. During the transfer movement, the position of the container is determined by the engagement of the bottom rollers of the moving container with the tracks of the stationary containers immediately underneath. This arrangement is shown in Figure 10 in which the roller 64 is rotatably mounted on the container 15 and engages the track 65 in the floor 66 of the frame 11. If the roller 64 were on a container in the upper portion of the stack, it would engage a similar track on top of the container such as is indicated at 26 and 27 in Figure 4.

Figures 11, 12:
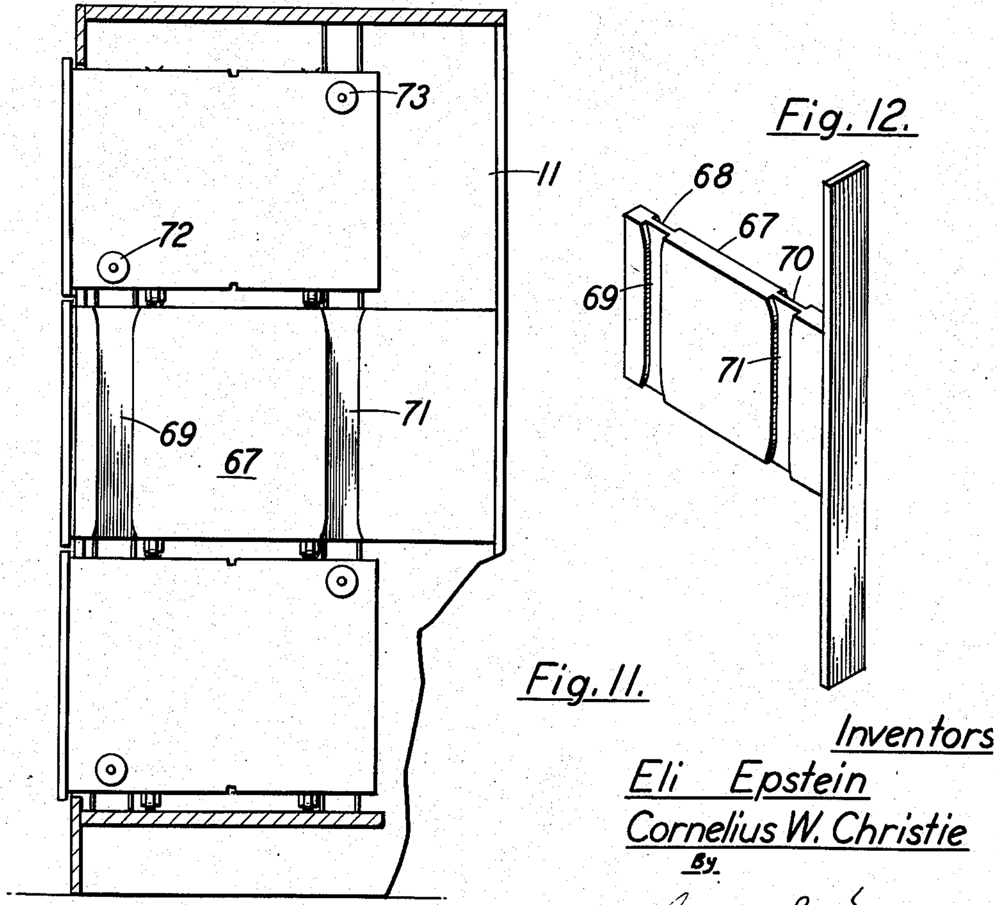
Figure 11 is a section taken on a vertical plane perpendicular to the front and rear of the device in approximately the center and illustrating the stabilizing rollers and the guiding channel at this portion of the device.
Figure 12 is a perspective view showing the structure for supporting the center stabilizing channels.

Referring to Figures 11 and 12, the construction of the central portion of the frame 11 is illustrated. This structure has the function of engaging the stabilizing rollers of the containers at this part of the stacks in order to prevent rotation that would otherwise be caused by the engagement of the lifting mechanism with the backs of the containers. The panel 67 contains the channels 68, 69, 70, and 71. These channels preferably have the flared openings as indicated to facilitate the engagement of the rollers 72 and 73 as the containers move in a downward or upward direction.

The fact that the mechanism provided by the present invention is adapted to move the end members of the stacks or containers, coupled with the fact that the intermediate containers are not directly acted upon by the mechanism makes possible a device that can be manufactured in broken components. A base section will include the lifting mechanism, and enough of the lower portion of a frame to permit the operation of the rollers 45. An upper frame component of any desired height can then be placed above this lower frame component, with stacks of containers of corresponding height. The uppermost frame component would of course provide for the pulleys for the belt 52, and would also carry suitable switch and control components to be discussed hereinafter. The belt 52 would be selected of a particular length appropriate to the height of the stacks and frame. In this manner, a series of standard components can be manufactured adapting the device to any desired ceiling height of clear space that may be available.

*Sequence of the shifting operations*

Figure 13:
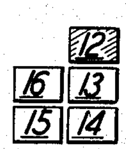
Figure 14:
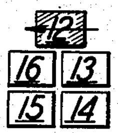
Figure 15:
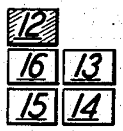
Figure 16:
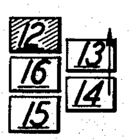
Figure 17:
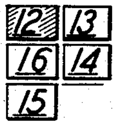
Figure 18:
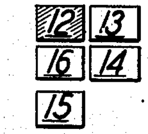
Figure 19:
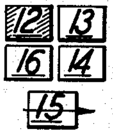
Figure 20:
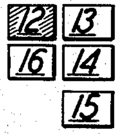
Figure 21:
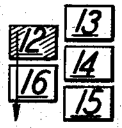
Figure 22:
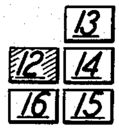

Referring to Figures 13 to 22 inclusive, schematic diagrams are shown indicating the relative positions of the containers at various points during the shifting movement, as viewed from the rear. The first position of the containers may be as shown in Figure 13 with the containers 12 at the uppermost portion of the right-hand stack. The operation of the transfer mechanism causes the container 12 to be moved horizontally across to the top of the left-hand stack, riding on the tracks of the containers 13 and 16 during this movement. Figure 14 shows the mid-position of this movement, and Figure 15 shows the terminal position with the container 12 now a part of the left-hand stack. Figure 16 shows the elevating movement that then takes place causing the right-hand stack to move in an upward direction. This movement continues to the point shown in Figure 17 with the container 13 now at a level opposite the container 12. This elevating movement continues to a point at which the containers 12 and 16 are lifted just clear of the container 15 to permit lateral movement of that container from the left-hand stack over to the right-hand stack. Figure 18 shows the terminal position of this lifting movement, showing clearance between the container 15 and the containers 14 and 16 so that the movement of container 15 is now possible. Figure 19 shows the transverse movement of the container 15 in process, and Figure 20 shows the terminal position of the cross movement. Figure 21 shows the downward movement of the left-hand column to occupy the space formally taken by the container 15. During this downward movement the containers 13 and 14 are lowered a sufficient amount to place them in engagement with the container 15. Figure 22 shows the terminal position of this movement, and it will be noted that this position is a duplicate in overall pattern of the position shown on Figure 13, but with the relative positions of the containers to the stacks somewhat changed.

The system for controlling the lifting and transferring mechanisms is schematically shown in Figure 23. For the sake of clarity of presentation, the lifting mechanism has been shown in Figure 23 in diagram only, and the position of the driving motor has been altered to facilitate the arrangement of the electrical circuit. The same is true of the motor for the transfer belt. The transfer belt 72 passes around suitable pulleys in the same manner as is indicated in the previous figures. The solenoid 73 controls the positioning of the upper length of the belt 72 with regard to urging it into engagement with the containers. The solenoid 74 has the same function at the bottom of the device. Energizing of the solenoid 73 will cause the continuously-moving belt 72 to be brought into engagement with a container and pull it across to the adjacent column. Energizing of the solenoid 74 will in like manner transfer the lowermost container from its original position over to the adjacent column. The drive motor 75 of the elevating mechanism is reversible, and its operation and direction of rotation are controlled by the switch 76. This switch is positioned by the solenoid 77 for lifting movement and by solenoid 78 for lowering movement. The engaging flaps of the lifting mechanism are controlled by the solenoids 79 and 80.

The sequence in which the various control solenoids are energized is determined by the position of a series of switches acted upon by the moving containers. The actuator 81 is adapted to establish a circuit between the contacts 82 or 83 depending upon its position. The actuator 84 is adapted to open and close a circuit between the contacts 85 and 86. The actuator 87 operates to establish circuits including either the contacts 88 and 89 or 90 and 91. Actuator 92 operates to establish a circuit between the contacts 93 and 94 or between contacts 95 and 96. Actuator 97 is adapted to control the opening and closing of a circuit between the contacts 98 and 99. Actuator 100 operates to close a circuit either between contacts 101 and 102 or between 103 and 104. With the direction-controlling switch 105 set as shown, a particular sequence of movements will be inaugurated as soon as the line voltage is applied to the transfer belt motor 106 through the reversing switch associated therewith, and to the lifting drive motor 75 through the off-on switch 107. If desired, the belt motor 106 and the motor 75 for the lifting mechanism can both be operated from the same off-on switch as is indicated at 107. A reversing switch must be interposed between the off-on switch and the motor 106 in order to control the direction of movement of the belt corresponding to the setting of the switch 105.

With the containers in the positions shown in dotted lines in Figure 23, the right and left hand stacks are in condition for the transverse movement of the upper container of the right hand column. It will be noted that the contacts 83 and also 101 and 102 are bridged causing the solenoid 73 to be energized and urging the belt 72 into engagement with the uppermost container. The movement of the belt 72 transfers the container in the right-hand column over to the left-hand column, and this movement continues until the actuator 81 is contacted by the moving container causing the circuit between the contacts 83 to be broken. This same movement establishes a circuit between the contacts 82. At this point a circuit including the contacts 88 and 89 will be completed since a container will not be bearing upon the actuator 87. The biased action of the switch requires the presence of a container in order to maintain the contacts between 90 and 91, and without a container being present the contacts 88 and 89 will be closed.

With the first transfer movement completed as indicated above, the stacks are now in condition for lifting to take place having the twofold function of (*a*) elevating the right-hand column approximately the height of one container, and (*b*) elevating the left-hand column sufficiently to give clearance for the transfer movement of the bottom container. The condition of the contacts 82 and of 88 and 89 complete a circuit energizing the solenoid 80 causing the lifting flap to engage the lowermost container in the right-hand column. The solenoid 77 is also energized causing the switch 76 to complete a circuit for rotating the motor 75 in a direction to create a lifting action. This movement continues until just before the right-hand column completes its vertical movement, at which point the actuator 84 is contacted by the moving roller 108. The closing of the contacts between 85 and 86 energizes the solenoid 79 and engages the lifting flap with the second container from the bottom of the left-hand column. The lifting mechanism is therefore in condition to elevate the two containers on top of the lowermost container to provide clearance for the transfer movement. The upward movement of the containers continues until the right-hand column strikes the actuator 87 breaking the circuit between the contacts 88 and 89. The device is then in position for the transfer movement of the lowermost container of the left-hand column over to the right-hand column. A circuit including the contacts 90, 91, 93, and 94 is now complete causing the solenoid 74 to be energized and raising the belt 72 into engagement with the lowermost container and inducing transfer movement over to the right-hand column. On completion of this movement, the device is in condition for the lowering of both columns sufficient to set the stacks upon the lowermost container of each column. To perform this operation, it will be noted that a circuit is established including the contacts 95, 96, 98, 99, 103, and 104. This circuit energizes the solenoid 78 and causes the switch 76 to energize the motor 75 in a direction appropriate for lowering the lifting mechanism. The lowering action continues until the actuator 100 is operated upon by the truck 109. At this point the lowering action has proceeded to completion and the stacks are again restored to the position shown in dotted lines in Figure 23. It may be noted that the lifting flaps remain active as long as they are carrying load.

It will be noted that the downward movement of the stacks must not cause the completion of the circuit between the contacts 88 and 89 or an interference will be set up between the solenoids 77 and 78. This is due to the fact that during the downward movement a period occurs in which the contacts 82 are closed. To prevent this interference, a so-called "high differential" switch is used governing contacts 88, 89, 90 and 91 and involving an actuator causing the operation of the switch in one direction at a different point than operation in the opposite direction takes place. In other words, the upward movement of the containers will trip the switch to close the circuit between the contacts 90 and 91. Movement in the opposite or downward direction does not cause the closing of the contacts 88 and 89, however, until a considerable amount of movement has taken place. This difference between the points of actuation in opposite directions is referred to as the "differential" of a switch. The amount of this differential must exceed the amount of clearance that the right-hand stack is elevated above the lowermost container for the lower transfer movement. As a result of this arrangement, the right-hand stack during the lowering operation is never dropped to a point where the circuit is established between the contacts 88 and 89.

In like manner, the circuit should not be closed between the contacts 103 and 104 during the elevating movement until after the circuit has been broken between the contacts 98 and 99. To assure this operation, this same type of switch action involving a high differential is utilized. If desired, the natural differential of the switch may be augmented by the use of a lever in which the switch actuator is acted upon by the lever at a point nearer its pivot than the point on the lever contacted by the moving mechanism. This action tends to increase the effective differential of the switch.

The enlarged section shown in Figure 24 shows the general type of switch which may be utilized. A snap action is built into this type of switch, and it will be noted that a circuit is established either between the terminals 110 and 111 or the terminals 112 and 113. The spring 114 establishes a normal condition in which the terminals 110 and 111 are associated. The snap action of the switch creates a differential between positions of the actuating button 115 at which the circuits are established.

The sequence-determining circuit shown in Figure 23 may of course be replaced by a conventional cam-operated series of switches causing the various controls to be energized in an established sequence. With the cam type of operation, however, any misfunction of the system will have a tendency to increase in damage due to the continued actuation of the various components. With the natural sequence determined by the position of the containers, any misfunction halts the operation of the device and reduces damage to a minimum.

A cursory examination of the structure outlined herein, including the mechanism, will indicate that a minimum of space is taken by the moving parts. Further, the confinement of the principal working components to a particular portion of the framework permits a series of frame components to be used adapting the device to various available spaces and provides a very valuable feature.

The particular embodiments of the present invention which have been illustrated in the accompanying drawings and discussed herein are for illustrative purposes only and are not to be considered as a limitation upon the appended claims. In these claims it is the intent of the inventors to claim the entire invention to which they are entitled in view of the prior art.

We claim:

1. A structure comprising: frame means; at least two columns of containers; elevating means adapted to raise and lower containers of each of said columns, said elevating means including horizontally disposed screwjack means, diagonal means pivotally connected at one end to said screwjack means and bearing at the opposite end against a vertically-disposed surface associated with said frame means, and engaging means adapted to couple one of said containers to said diagonal means; transfer means adapted to move the uppermost and lowermost containers in each column over to the adjacent column; and sequence-determining means controlling the action of said elevating means and transfer means.

2. A structure comprising: frame means; at least two columns of containers; elevating means adapted to raise and lower containers of each of said columns, said elevating means including horizontally disposed screwjack means, diagonal means pivotally connected at one end to said screwjack means and bearing at the opposite end against a vertically-disposed surface associated with said frame means, and engaging means adapted to couple one of said containers to said diagonal means; transfer means adapted to move the uppermost and lowermost containers in each column over to the adjacent column, said transfer means including a tension member continuously running on a path surrounding both of said columns and means adapted to selectively urge said tension member into frictional engagement with a container in an end position on said columns; and sequence-determining means controlling the action of said elevating means and transfer means.

3. A structure comprising: frame means; at least two columns of containers, one of said columns having one more container than the other; elevating means adapted to raise and lower containers of each of said columns, said elevating means including horizontally disposed screwjack means, diagonal means pivotally connected at one end to said screwjack means and bearing at the opposite end against a vertically-disposed surface associated with said frame means, and engaging means adapted to couple one of said containers to said diagonal means; transfer means adapted to move the uppermost and lowermost containers in each column over to the adjacent column, said transfer means including a tension member continuously running on a path surrounding both of said columns and means adapted to selectively urge said tension member into frictional engagement with a container in an end position on said columns; and sequence-determining means controlling the action of said elevating means and transfer means, said sequence-determining means including switches actuated by said containers.

4. A structure comprising: frame means; at least two columns of containers, each of said containers having guide tracks on the top and also having bearing means on the bottom adapted to cooperate with the guide tracks of the container below; elevating means adapted to raise and lower containers of each of said columns, said elevating means including horizontally disposed screwjack means, diagonal means pivotally connected at one end to said screwjack means and bearing at the opposite end against a vertically-disposed surface associated with said frame means, and engaging means adapted to couple one of said containers to said diagonal means; transfer means adapted to move the uppermost and lowermost containers in each column over to the adjacent column, said transfer means including a tension member continuously running on a path surrounding both of said columns and means adapted to selectively urge said tension member into frictional engagement with a container in an end position on said columns, and sequence-determining means controlling the action of said elevating means and transfer means.

5. A structure comprising: frame means; at least two columns of containers, one of said columns having one more container than the other; elevating means adapted to raise and lower containers of each of said columns including selective engaging means for engaging said containers, said elevating means including horizontally disposed screwjack means, diagonal means pivotally connected at one end to said screwjack means and bearing at the opposite end against a vertically-disposed surface associated with said frame means, and engaging means adapted to couple one of said containers to said diagonal means; transfer means adapted to move the uppermost and lowermost containers in each column over to the adjacent column, said transfer means including a tension member continuously running on a path surrounding both of said columns and deflecting means adapted to selectively urge said tension member into frictional engagement with a container in an end position on said columns; and sequence-determining means controlling the action of said elevating means and transfer means, said sequence-determining means establishing substantially the following cycle of operations: (*a*) transfer of the top container in the higher column over to the adjacent column, (*b*) elevation of the then shortest column an amount sufficient to give clearance for transfer of the bottom container of the then higher column, and the elevation of the higher column above the bottom container to give clearance, (*c*) transfer of the lowest container of the then higher column over to the adjacent column, (*d*) lowering of both columns until the weight thereof is not carried by said elevating means.

6. A structure comprising: frame means; at least two columns of similar containers, one of said columns having one more container than the other; elevating means adapted to raise and lower containers of each of said columns including selective engaging means for engaging said containers; transfer means adapted to move the uppermost and lowermost containers in each column over to the adjacent column, said transfer means including a tension member continuously running on a path surrounding both of said columns and deflecting means adapted to selectively urge said tension member into frictional engagement with a container in an end position on said columns; and sequence-determining means controlling the action of said elevating means and deflecting means, said sequence-determining means including control switch means actuated by said containers and establishing substantially the following cycle of operations: (*a*) transfer of the top container in the higher column over to the adjacent column, (*b*) elevation of the then shortest column an amount sufficient to give clearance for transfer of the bottom container of the then higher column, and the elevation of the higher column above the bottom container to give clearance, (*c*) transfer of the lowest container of the then higher columns over to the adjacent column, (*d*) lowering of both columns until the weight thereof is not carried by said elevating means.

7. A structure comprising: frame means; at least two columns of similar containers, one of said columns having one more container than the other; elevating means adapted to raise and lower containers of each of said columns including selective engaging means for engaging said containers; transfer means adapted to move the uppermost and lowermost containers in each column over to the adjacent column, said transfer means including a tension member continuously running on a path surrounding both of said columns and deflecting means adapted to selectively urge said tension member into frictional engagement with a container in an end position on said columns; and sequence-determining means controlling the action of said elevating means and deflecting means, said sequence-determining means establishing substantially the following cycle of operations: (*a*) transfer of the top container in the higher column over to the adjacent column, (*b*) elevation of the then shortest column an amount sufficient to give clearance for transfer of the bottom container of the then higher column, and the elevation of the higher column above the bottom container to give clearance, (*c*) transfer of the lowest container of the then higher column over to the adjacent column, (*d*) lowering of both columns until the weight thereof is not carried by said elevating means.

8. A structure comprising: frame means; at least two columns of similar containers, one of said columns having one more container than the other; elevating means adapted to raise and lower containers of each of said columns including selective engaging means for engaging said containers; transfer means adapted to move the uppermost and lowermost containers in each column over to the adjacent column, said transfer means including a tension member continuously running on a path surrounding both of said columns and deflecting means adapted to selectively urge said tension member into engagement with a container in an end position on said columns; and sequence-determining means controlling the action of said elevating means and deflecting means, said sequence-determining means establishing substantially the following cycle of operations: (*a*) transfer of the top container in the higher column over to the adjacent column, (*b*) elevation of the then shorter column an amount sufficient to give clearance for transfer of the bottom container of the then higher column, and the elevation of the higher column above the bottom container to give clearance, (*c*) transfer of the lowest container of the then higher column over to the adjacent column, (*d*) lowering of both columns until the weight thereof is not carried by said elevating means.

9. A structure comprising at least two columns of containers; elevating means adapted to raise or lower containers of each of said columns including selective engaging means for engaging said containers; transfer means adapted to move the uppermost and lowermost containers in each column over to the adjacent column, said transfer means including continuously-running endless tension means disposed along a path surrounding both of said columns of containers, and also including deflecting means adapted to urge said tension means from its normal path into frictional engagement with said containers; and sequence-determining means controlling the action of said elevating means and deflecting means.

10. A structure comprising at least two columns of containers; elevating means adapted to raise or lower containers of each of said columns including selective engaging means for engaging said containers; transfer means adapted to move the uppermost and lowermost containers in each column over to the adjacent column, said transfer means including continuously-running endless tension means disposed along a path surrounding both of said columns of containers, and also including deflecting means adapted to urge said tension means from its normal path into engagement with said containers; and sequence-determining means controlling the action of said elevating means and deflecting means.

11. A structure comprising at least two columns of containers; elevating means adapted to raise or lower containers of each of said columns including selective engaging means for engaging said containers; transfer means adapted to move the uppermost and lowermost containers in each column over to the adjacent column, said transfer means including continuously-running endless tension means disposed along a path following said columns of containers, and also including deflecting means adapted to urge said tension means from its normal path into engagement with said containers; and sequence-determining means controlling the action of said elevating means and deflecting means.

CORNELIUS W. CHRISTIE.
ELI EPSTEIN.

REFERENCES CITED

The following references are of record in the file of this patent:

UNITED STATES PATENTS

| Number | Name | Date |
|---|---|---|
| 1,782,410 | Cook | Nov. 25, 1930 |
| 1,811,545 | Goddard | June 23, 1931 |
| 2,451,120 | Rossetter | Oct. 12, 1948 |
| 2,513,502 | Lyon | July 4, 1950 |

FOREIGN PATENTS

| Number | Country | Date |
|---|---|---|
| 467,061 | Great Britain | June 10, 1937 |